United States Patent
Liao et al.

(10) Patent No.: US 11,255,694 B2
(45) Date of Patent: Feb. 22, 2022

(54) NAVIGATION METHOD, NAVIGATION TERMINAL, AND SERVER

(71) Applicant: HUAWEI TECHNOLOGIES CO., LTD., Shenzhen (CN)

(72) Inventors: Heng Liao, Shenzhen (CN); Guoyao Wen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 15/917,835

(22) Filed: Mar. 11, 2018

(65) Prior Publication Data

US 2018/0195877 A1    Jul. 12, 2018

Related U.S. Application Data

(63) Continuation of application No. PCT/CN2015/098882, filed on Dec. 25, 2015.

(51) Int. Cl.
*G01C 21/36* (2006.01)
*G08G 1/0968* (2006.01)

(52) U.S. Cl.
CPC ....... *G01C 21/3694* (2013.01); *G01C 21/362* (2013.01); *G01C 21/3682* (2013.01); *G08G 1/096827* (2013.01); *G08G 1/096838* (2013.01); *G08G 1/096844* (2013.01)

(58) Field of Classification Search
CPC ... G06Q 10/063114; G06Q 10/063116; G06Q 10/063118; G06Q 10/06312; G06Q 10/08355; G06Q 50/30; G01C 21/3694; G01C 21/362; G01C 21/3682;

(Continued)

(56) References Cited

U.S. PATENT DOCUMENTS

| | | | |
|---|---|---|---|
| 6,243,645 B1 * | 6/2001 | Moteki | G01C 21/26 340/988 |
| 8,706,397 B2 * | 4/2014 | Adler | G01C 21/3492 701/408 |
| 9,141,112 B1 | 9/2015 | Loo et al. | |

(Continued)

FOREIGN PATENT DOCUMENTS

| | | |
|---|---|---|
| CN | 1755330 A | 4/2006 |
| CN | 101368827 A | 2/2009 |

(Continued)

*Primary Examiner* — Anne Marie Antonucci
*Assistant Examiner* — Andrew J Cromer
(74) *Attorney, Agent, or Firm* — Maier & Maier, PLLC

(57) ABSTRACT

A navigation method, a navigation terminal, and a server is disclosed. The method in the embodiments of the present disclosure includes: obtaining, by a navigation terminal, first navigation information; generating, by the navigation terminal, a first navigation route according to the first navigation information; sending, by the navigation terminal, information about the first navigation route to a server; receiving, by the navigation terminal, second navigation information sent by the server, where the second navigation information includes a real-time route parameter of the first navigation route; and when the real-time route parameter of the first navigation route satisfies a preset condition, effectuating, by the navigation terminal, a navigation window to pop up or automatically adjusting content presented in a navigation window.

18 Claims, 9 Drawing Sheets

(58) Field of Classification Search
CPC ....... G08G 1/096827; G08G 1/096838; G08G 1/096844; G08G 1/096811
See application file for complete search history.

(56) References Cited

U.S. PATENT DOCUMENTS

| | | | |
|---|---|---|---|
| 9,805,601 B1* | 10/2017 | Fields .................... | G06Q 40/08 |
| 2005/0131643 A1* | 6/2005 | Shaffer .............. | G01C 21/3492 |
| | | | 701/414 |
| 2006/0069500 A1 | 3/2006 | Hashizume | |
| 2006/0287818 A1 | 12/2006 | Okude et al. | |
| 2008/0051995 A1* | 2/2008 | Lokshin ............ | G01C 21/3415 |
| | | | 701/416 |
| 2010/0049704 A1* | 2/2010 | Sumiya .................. | G01C 21/26 |
| | | | 707/724 |
| 2010/0100310 A1* | 4/2010 | Eich ................... | G01C 21/3661 |
| | | | 701/533 |
| 2011/0106657 A1 | 5/2011 | Yu et al. | |
| 2015/0168167 A1 | 6/2015 | Hwang et al. | |
| 2015/0179068 A1 | 6/2015 | Liu et al. | |
| 2016/0343249 A1 | 11/2016 | Gao et al. | |

FOREIGN PATENT DOCUMENTS

| | | |
|---|---|---|
| CN | 102598695 A | 7/2012 |
| CN | 102982693 A | 3/2013 |
| CN | 103185600 A | 7/2013 |
| CN | 103256936 A | 8/2013 |
| CN | 103398715 A | 11/2013 |
| CN | 103873175 A | 6/2014 |
| CN | 104344832 A | 2/2015 |
| CN | 104933293 A | 9/2015 |
| CN | 105115488 A | 12/2015 |
| DE | 102014216954 A1 | 6/2015 |
| JP | 2006275782 A | 10/2006 |
| JP | 2007269268 A | 10/2007 |
| JP | 2008203013 A | 9/2008 |
| JP | 2009188613 A | 8/2009 |
| JP | 2011141192 A | 7/2011 |
| JP | 5304404 B2 | 10/2013 |
| KR | 20100002955 A | 1/2010 |
| KR | 20110042662 A | 4/2011 |
| KR | 20150071785 A | 6/2015 |
| WO | 2011/121788 A1 | 10/2011 |
| WO | 2013/038266 A1 | 3/2013 |

* cited by examiner

NAVIGATION METHOD, NAVIGATION TERMINAL, AND SERVER

CROSS-REFERENCE TO RELATED APPLICATIONS

This application is a continuation of International Application No. PCT/CN2015/098882, filed on Dec. 25, 2015, the disclosure of which is hereby incorporated by reference in its entirety.

TECHNICAL FIELD

The present application relates to the communications field, and in particular, to a navigation method, a navigation terminal, and a server.

BACKGROUND

A user sometimes performs another operation in a navigation process, for example, listens to music or makes a call. That is, a music window, a communication window, or the like is displayed on a display interface of a navigation terminal. However, people usually expect to know in advance a road condition ahead. In this case, the user usually needs to switch the display interface of the navigation terminal from another window to a navigation window, to obtain road-condition-related information. Usually, window switching is manually performed by the user. However, it is inconvenient to perform a manual operation during the navigation. Therefore, automatic window switching is needed.

A timer may be set in an existing navigation terminal. After the timer expires, the navigation terminal may switch from another window to a navigation window, to obtain road-condition-related information.

However, when the timer is set in the navigation terminal currently, excessively long duration may be set. If road condition information of an emergency situation is generated within the duration, the navigation terminal cannot display the navigation window in a timely manner. Consequently, a user cannot obtain the road-condition-related information in a timely manner.

SUMMARY

Embodiments of the present disclosure provide a navigation method, a navigation terminal, and a server, so that when a real-time route parameter changes and satisfies a preset condition, the navigation terminal can display a navigation window in a timely manner, and a user can obtain road-condition-related information in a timely manner.

An embodiment of the present application includes a navigation method. Specifically, a navigation terminal obtains first navigation information. The navigation terminal may receive the first navigation information from a server, or may obtain the first navigation information from the navigation terminal itself. A manner in which the navigation terminal obtains the first navigation information is not limited herein.

The navigation terminal generates a first navigation route according to the first navigation information. The navigation terminal does not generate only one navigation route according to the first navigation information. The navigation terminal may generate multiple navigation routes at the same time. Then the navigation terminal selects a corresponding route from the multiple navigation routes according to preset navigation-related information and displays the route. Alternatively, the navigation terminal may display all of the multiple navigation routes. A generation manner and a display manner are not limited herein.

The navigation terminal sends information about the first navigation route to the server. After receiving the information about the first navigation route, the server generates a real-time route parameter of the first navigation route according to the information, for sending the real-time route parameter to the navigation terminal.

The navigation terminal receives second navigation information sent by the server. The second navigation information includes the real-time route parameter of the first navigation route.

The "real-time" herein may be construed as that there may be a delay, provided that information can be correctly provided. This is not limited herein.

When the real-time route parameter of the first navigation route satisfies a preset condition, the navigation terminal effectuates a navigation window to pop up or automatically adjusts content presented in a navigation window.

After determining the first navigation route, the navigation terminal may further receive the second navigation information that is sent by the server and that includes a real-time road-condition-related parameter of the first navigation route. When the real-time route parameter of the first navigation route in the second navigation information satisfies the preset condition, the navigation terminal pops up the navigation window or automatically adjusts the content presented in the navigation window. In the solution in this embodiment of the present application, when the real-time route parameter changes and satisfies the preset condition, the navigation terminal can display the navigation window in a timely manner, so that a user can obtain road-condition-related information in a timely manner.

The navigation method in this embodiment of the present application further includes:

performing, by the navigation terminal, navigation according to the first navigation route.

In this embodiment of the present application, the navigation terminal performs navigation according to the first navigation route, making it convenient for the user to drive. In addition, that the navigation terminal performs, during the navigation by the navigation terminal, route planning according to the real-time route parameter to generate a second navigation route is an important scenario in the solution in this embodiment of the present application.

In the navigation method in this embodiment of the present application, there are multiple specific implementations in which the real-time route parameter of the first navigation route satisfies the preset condition. For example, the real-time route parameter may indicate a road traffic condition, or may indicate a fleet location relationship such as a location relationship between a vehicle having a same terminal and a vehicle in which this navigation terminal is located, or may indicate a scenic spot or another destination within a specific range of the terminal, for example, a shopping mall or a gas station. Specific descriptions are provided below separately.

When the real-time route parameter is a road traffic condition parameter, that the real-time route parameter satisfies a preset condition includes: the road traffic condition parameter indicates that the first navigation route is congested, or the weather is bad, or a vehicle speed is less than a first preset threshold, or a quantity of vehicles that stop at a red light is greater than a second preset threshold, or a location of the navigation terminal approaches an intersection.

In addition to the road traffic condition parameter, there may further be many parameters in other aspects, for example, whether temporary traffic control is conducted or whether a road is under repair, provided that a specific traffic condition can be reflected.

In this embodiment of the present application, the navigation terminal provides road condition information that includes road condition affecting factors in multiple aspects, to provide an information service for the user more accurately.

In some embodiments, before the effectuating, by the navigation terminal, a navigation window to pop up or automatically adjusting content presented in a navigation window, the method further includes:

The navigation terminal determines a candidate navigation route according to the second navigation information.

The candidate route is an optional navigation route generated for avoiding the first navigation route, and there may be one or more candidate routes. This is not limited herein.

The navigation terminal obtains a road condition parameter of the candidate navigation route from the server.

The road condition parameter is the same as the road traffic condition parameter, and details are not described herein.

The navigation terminal determines the second navigation route in the candidate navigation route according to the road condition parameter, and the navigation terminal generates a first navigation window according to the second navigation route.

In this embodiment of the present application, the navigation terminal re-plans the second navigation route according to a real-time road traffic condition parameter, so that the user does not need to perform a manual operation during a route change after obtaining the real-time road traffic condition parameter, and undergoes more convenient user experience.

In some embodiments, before the effectuating, by the navigation terminal, a navigation window to pop up or automatically adjusting content presented in a navigation window, the method further includes:

determining, by the navigation terminal, a first navigation area according to the second navigation information, where the first navigation area includes the location of the navigation terminal and an area in which the road traffic condition parameter occurs; and generating, by the navigation terminal, a second navigation window according to the first navigation area and the road traffic condition parameter.

When displaying a real-time road condition parameter, the second navigation window generated by the navigation terminal may display the real-time road condition parameter by using a particular color or a particular identifier, provided that the road condition parameter can be correctly represented. This is not limited herein.

In this embodiment of the present application, the navigation terminal determines a navigation area according to the real-time road traffic condition parameter, and displays the real-time road traffic condition parameter by using the second navigation window, so that the user can clearly and plainly know a current real-time road traffic condition.

In some embodiments, before the effectuating, by the navigation terminal, a navigation window to pop up or automatically adjusting content presented in a navigation window, the method further includes:

determining, by the navigation terminal, a second navigation area according to the second navigation information, where the second navigation area includes the location of the navigation terminal, a target location, and an area in which the road traffic condition parameter occurs; and generating, by the navigation terminal, a third navigation window according to the second navigation area and the road traffic condition parameter.

It may be understood that, when displaying a real-time road condition parameter, the third navigation window generated by the navigation terminal may display the real-time road condition parameter by using a particular color or a particular identifier, provided that the road condition parameter can be correctly represented. This is not limited herein.

In this embodiment of the present application, the navigation terminal determines a navigation area according to the real-time road traffic condition parameter, and displays the real-time road traffic condition parameter by using the third navigation window, so that the user can clearly and plainly know a current real-time road traffic condition.

When the real-time route parameter is a location parameter of a target terminal, that the real-time route parameter satisfies a preset condition includes: a distance between a location of the navigation terminal and a location corresponding to the location parameter of the target terminal is greater than a preset distance.

In this embodiment of the present application, the navigation terminal monitors location information of the target terminal in real time, to prompt itself in a timely manner to adjust a speed, thereby maintaining a distance from the target terminal.

In some embodiments, before the effectuating, by the navigation terminal, a navigation window to pop up or automatically adjusting content presented in a navigation window, the method further includes:

determining, by the navigation terminal, the location of the navigation terminal and the location of the target terminal;

determining, by the navigation terminal, a third navigation route according to the location of the navigation terminal and the location of the target terminal; and generating, by the navigation terminal, a fourth navigation window according to the third navigation route.

In this embodiment of the present application, the navigation terminal re-plans the third navigation route according to the location of the navigation terminal and the location of the target terminal, so that the user does not need to perform a manual operation during a route change after learning that the navigation terminal is quite far away from the target terminal, and undergoes more convenient user experience.

In some embodiments, before the effectuating, by the navigation terminal, a navigation window to pop up or automatically adjusting content presented in a navigation window, the method further includes:

determining, by the navigation terminal, the location of the navigation terminal and the location of the target terminal; and generating, by the navigation terminal, a fifth navigation window according to the location of the navigation terminal and the location of the target terminal.

In this embodiment of the present application, the navigation terminal displays the location of the navigation terminal and the location of the target terminal in the navigation window, so that the user may clearly and plainly know the location of the target terminal.

When the real-time route parameter is a location parameter of a scenic spot, that the real-time route parameter satisfies a preset condition includes: the scenic spot corresponding to the location parameter of the scenic spot exists in a preset range of a location of the navigation terminal.

In this embodiment of the present application, the navigation terminal can obtain information about a nearby scenic spot during a drive in a timelier manner, so that the user can more conveniently plan his or her travel.

In some embodiments, before the effectuating, by the navigation terminal, a navigation window to pop up or automatically adjusting content presented in a navigation window, the method further includes:

determining, by the navigation terminal, the location of the navigation terminal and a location of the scenic spot;

determining, by the navigation terminal, a fourth navigation route according to the location of the navigation terminal and the location of the scenic spot; and generating, by the navigation terminal, a sixth navigation window according to the fourth navigation route.

In this embodiment of the present application, the navigation terminal re-plans the second navigation route according to the location of the navigation terminal and the location of the scenic spot, so that the user does not need to perform a manual operation during a route change after learning the location of the scenic spot, and undergoes more convenient user experience.

In some embodiments, before the effectuating, by the navigation terminal, a navigation window to pop up or automatically adjusting content presented in a navigation window, the method further includes:

determining, by the navigation terminal, the location of the navigation terminal and a location of the scenic spot; and generating, by the navigation terminal, a seventh navigation window according to the location of the navigation terminal and the location of the scenic spot.

In this embodiment of the present application, the navigation terminal displays the location of the navigation terminal and the location of the scenic spot in the navigation window, so that the user may clearly know the location of the scenic spot.

An embodiment of the present application includes another navigation method. Specifically, a server obtains a real-time route parameter of a first navigation route. The first navigation route is generated by a navigation terminal according to obtained first navigation information.

When the real-time route parameter of the first navigation route satisfies a preset condition, the server generates second navigation information according to the real-time route parameter.

The server sends the second navigation information to the navigation terminal, so that the navigation terminal effectuates a navigation window to pop up or automatically adjusts content presented in a navigation window.

In the solution in this embodiment of the present application, the navigation terminal displays the navigation window by using the real-time route parameter. When the real-time route parameter changes, the navigation terminal can display the navigation window in a timely manner, so that the user can obtain road-condition-related information in a timely manner.

Similar to the application content of the first aspect of the embodiments of the present disclosure, that the real-time route parameter of the first navigation route satisfies a preset condition includes: the first navigation route is congested, or the weather is bad, or a vehicle speed is less than a first preset threshold, or a quantity of vehicles that stop at a red light is greater than a second preset threshold, or a location of the navigation terminal approaches an intersection; a distance between a location of the navigation terminal and a location of a target terminal is greater than a preset distance; a scenic spot that satisfies a preset condition exists in a preset range of a location of the navigation terminal; or the like. Details are not described herein again.

An embodiment of the present application provides a navigation terminal. The navigation terminal includes:

a first obtaining module, configured to obtain first navigation information;

a first generation module, configured to generate a first navigation route according to the first navigation information obtained by the first obtaining module;

a first sending module, configured to send information about the first navigation route to a server;

a receiving module, configured to receive second navigation information sent by the server, where the second navigation information includes a real-time route parameter of the first navigation route generated by the first generation module; and a display module, configured to: when the real-time route parameter satisfies a preset condition, effectuate a navigation window to pop up or automatically adjust content presented in a navigation window.

In some embodiments, the navigation terminal further includes:

a navigation module, configured to perform navigation according to the first navigation route generated by the first generation module.

In this embodiment of the present application, the navigation terminal performs navigation according to the first navigation route, making it convenient for a user to drive. In addition, that the navigation terminal performs, during the navigation by the navigation terminal, route planning according to the real-time route parameter to generate a second navigation route is also an important scenario in the solution in this embodiment of the present application.

Likewise, that the real-time route parameter of the first navigation route satisfies a preset condition includes: the first navigation route is congested, or the weather is bad, or a vehicle speed is less than a first preset threshold, or a quantity of vehicles that stop at a red light is greater than a second preset threshold, or a location of the navigation terminal approaches an intersection; a distance between a location of the navigation terminal and a location of a target terminal is greater than a preset distance; a scenic spot that satisfies a preset condition exists in a preset range of a location of the navigation terminal; or the like.

In some embodiments, the navigation terminal further includes:

a first determining module, configured to determine a candidate navigation route according to the second navigation information received by the receiving module;

a second obtaining module, configured to obtain, from the server, a road condition parameter of the candidate navigation route determined by the first determining module;

a second determining module, configured to determine, according to the road condition parameter obtained by the second obtaining module, a second navigation route in the candidate navigation route determined by the first determining module; and a second generation module, configured to generate a first navigation window according to the second navigation route determined by the second determining module.

In some embodiments, the navigation terminal further includes:

a third determining module, configured to determine a first navigation area according to the second navigation information received by the receiving module, where the first navigation area includes the location of the navigation terminal and an area in which a road traffic condition parameter occurs; and a third generation module, configured to generate a second navigation window according to the first navigation area determined by the third determining module.

In some embodiments, the navigation terminal further includes:

a fourth determining module, configured to determine a second navigation area according to the second navigation information received by the receiving module, where the second navigation area includes information about the navigation terminal, a target location, and an area in which a road traffic condition parameter occurs; and a fourth generation module, configured to generate a third navigation window according to the second navigation area determined by the fourth determining module.

In some embodiments, the navigation terminal further includes:

a fifth determining module, configured to determine the location of the navigation terminal and the location of the target terminal;

a sixth determining module, configured to determine a third navigation route according to the location of the navigation terminal determined by the fifth determining module and the location of the target terminal determined by the fifth determining module; and a fifth generation module, configured to generate a fourth navigation window according to the third navigation route determined by the sixth determining module.

In some embodiments, the navigation terminal further includes:

a seventh determining module, configured to determine the location of the navigation terminal and the location of the target terminal; and a sixth generation module, configured to generate a fifth navigation window according to the location of the navigation terminal determined by the seventh determining module and the location of the target terminal determined by the seventh determining module.

In some embodiments, the navigation terminal further includes:

an eighth determining module, configured to determine the location of the navigation terminal and a location of the scenic spot;

a ninth determining module, configured to determine a fourth navigation route according to the location of the navigation terminal determined by the eighth determining module and the location of the scenic spot determined by the eighth determining module; and a seventh generation module, configured to generate a sixth navigation window according to the fourth navigation route determined by the ninth determining module.

In some embodiments, the navigation terminal further includes:

a tenth determining module, configured to determine the location of the navigation terminal and a location of the scenic spot; and an eighth generation module, configured to generate a seventh navigation window according to the location of the navigation terminal determined by the tenth determining module and the location of the scenic spot determined by the tenth determining module.

An embodiment of the present application provides another navigation terminal. The navigation terminal includes:

a first radio frequency module, a first processing module, a first storage module, a first antenna, and a first bus, where the first radio frequency module is connected to the first antenna, and the first radio frequency module, the first processing module, and the first storage module are connected by using the first bus;

the first radio frequency module sends information about a first navigation route to a server by using the first antenna, and receives second navigation information sent by the server; and the first processing module executes the following actions:

obtaining first navigation information; generating the first navigation route according to the first navigation information; and effectuating a navigation window to pop up.

In some embodiments, the first processing module may further execute the following actions:

determining a candidate navigation route according to the second navigation information, obtaining a road condition parameter of the candidate navigation route from the server, determining a second navigation route in the candidate navigation route according to the road condition parameter, and generating a first navigation window according to the second navigation route; or determining a location of the navigation terminal and a location of a target terminal, determining a third navigation route according to the location of the navigation terminal and the location of the target terminal, and generating a fourth navigation window according to the third navigation route, or generating a fifth navigation window according to the location of the navigation terminal and the location of the target terminal; or determining a location of the navigation terminal and a location of a scenic spot, determining a fourth navigation route according to the location of the navigation terminal and the location of the scenic spot, and generating a sixth navigation window according to the fourth navigation route, or generating a seventh navigation window according to the location of the navigation terminal and the location of the scenic spot; or determining a first navigation area according to the second navigation information, where the first navigation area includes a location of the navigation terminal and an area in which a road traffic condition parameter occurs, and generating a second navigation window according to the first navigation area; or determining a second navigation area according to the second navigation information, where the second navigation area includes a location of the navigation terminal, a target location, and an area in which a road traffic condition parameter occurs, and generating a third navigation window according to the second navigation area.

An embodiment of the present application provides a server. The server includes:

a receiving module, configured to receive information that is about a first navigation route and that is sent by a navigation terminal;

a third obtaining module, configured to obtain a real-time route parameter of the first navigation route, where the first navigation route is generated by the navigation terminal according to obtained first navigation information;

a ninth generation module, configured to: when the real-time route parameter satisfies a preset condition, generate second navigation information according to the real-time route parameter; and a sending module, configured to send the second navigation information generated by the ninth generation module to the navigation terminal, so that the navigation terminal effectuates a navigation window to pop up or automatically adjusts content presented in a navigation window.

An embodiment of the present application provides another server. The server includes:

a second radio frequency module, a second processing module, a second storage module, a second antenna, and a second bus, where the second radio frequency module is connected to the second antenna, and the second radio frequency module, the second processing module, and the second storage module are connected by using the second bus;

the second radio frequency module receives, by using the second antenna, information that is about a first navigation route and that is sent by a navigation terminal, and sends second navigation information to the navigation terminal; and the second processing module implements the following functions:

obtaining a real-time route parameter of the first navigation route; and generating the second navigation information.

It should be noted that, the technical solution of the present application essentially, or a part contributing to the prior art, or all or a part of the technical solution may be implemented in the form of a software product. The computer software product is stored in a storage medium.

An embodiment of the present application provides a storage medium, including:

the storage medium stores a program for executing the following instructions:

obtaining, by a navigation terminal, first navigation information;

generating, by the navigation terminal, a first navigation route according to the first navigation information;

sending, by the navigation terminal, information about the first navigation route to a server;

receiving, by the navigation terminal, second navigation information sent by the server, where the second navigation information includes a real-time route parameter of the first navigation route; and when the real-time route parameter of the first navigation route satisfies a preset condition, effectuating, by the navigation terminal, a navigation window to pop up or automatically adjusting content presented in a navigation window.

The storage medium includes: any medium that can store program code, such as a USB flash drive, a removable hard disk, a read-only memory (ROM), a random access memory (RAM), a magnetic disk, or an optical disk.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments recorded in this application, and persons of ordinary skill in the art may still derive other drawings from these accompanying drawings.

DESCRIPTION OF EMBODIMENTS

The embodiments of the present disclosure provide a navigation method, a navigation terminal, and a server, so that when a real-time route parameter changes and satisfies a preset condition, the navigation terminal can display a navigation window in a timely manner, and a user can obtain road-condition-related information in a timely manner.

To make persons of ordinary skill in the art better understand the technical solutions in the embodiments of the present disclosure, the following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without undue experiment shall fall within the protection scope of the embodiments of the present disclosure.

In the specification, claims, and accompanying drawings of embodiments of the present disclosure, the terms "first", "second", "third", "fourth", and so on (if existent) are intended to distinguish between similar objects but do not necessarily indicate a specific order or sequence. It should be understood that the terms termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
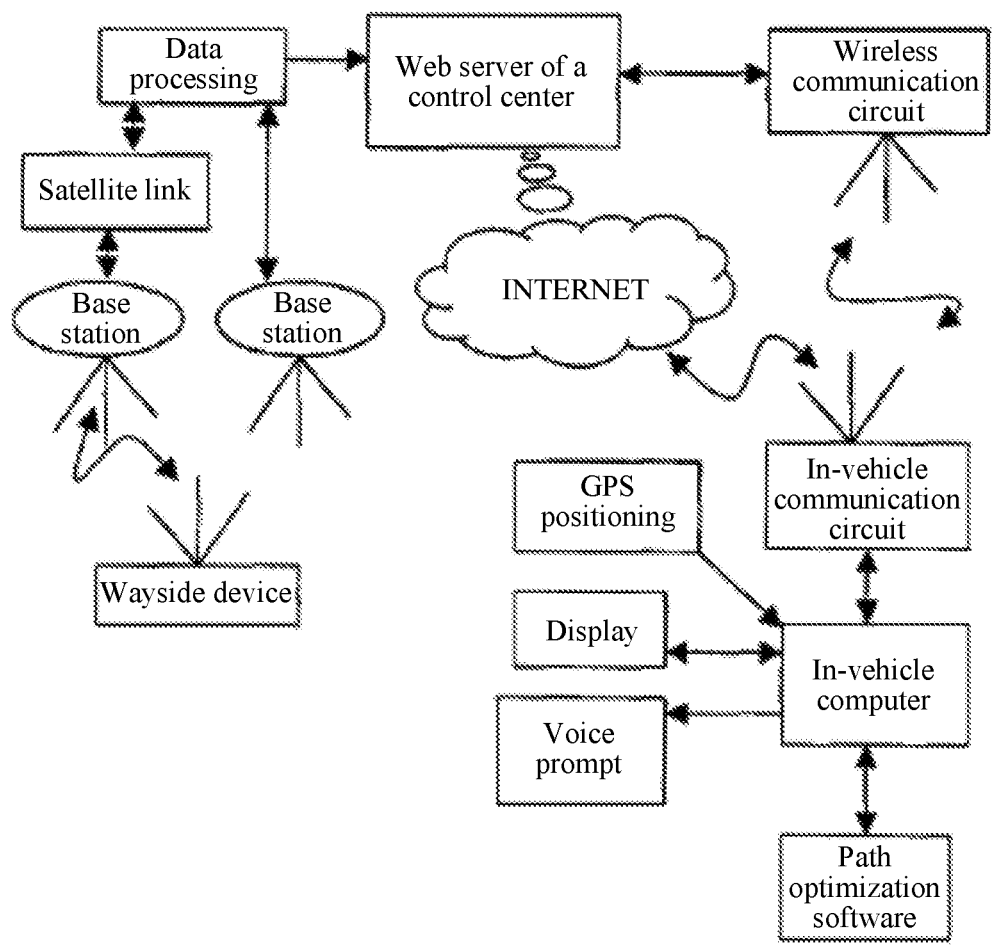
FIG. 1 is a schematic framework diagram of a navigation system according to an embodiment of the present application.

In an embodiment of the present disclosure, FIG. 1 shows a general composition of a typical navigation system. The navigation system mainly includes four subsystems:

Traffic information collection and processing subsystem: Traffic information is collected by a wayside device and a traffic control center. The wayside device obtains traffic volume information of a traffic network by using a sensor, and transmits the traffic volume information of the traffic network to the traffic control center in a wireless manner. The control center predicts traffic volumes in road segments and at intersections in a network in a rolling manner, and performs dynamic traffic allocation by using a real-time dynamic traffic allocation module and software, to provide a reference for navigation. Path navigation is based on the obtaining of traffic volume information.

Vehicle positioning subsystem: A function of the vehicle positioning subsystem is to determine an exact location of a vehicle in a transport network, and includes: how to correctly modify an error of an in-vehicle station according to a difference measured by a reference station, thereby implementing accurate positioning; establishing a systematic communications network, including signal coding, transmission, and receiving, signal modulation and demodulation, and other issues; establishing a systematic adaptive architecture to constantly modify an electronic map; and establishing a fault diagnosis architecture to ensure that a location of a vehicle can still be accurately determined when a system fault occurs or when a relatively big error occurs in signal transmission.

Traffic information service subsystem: The traffic information service subsystem is an important part of a traffic flow navigation system. The traffic information service subsystem may transfer traffic information (including predicted traffic information) computed by a host to the public by using various propagation media. These media include a cable television, a networked computer, a radio, a public telephone stall, a variable signboard by the road, and an in-vehicle receiving apparatus. A traveler may obtain traffic navigation information both at home and on the road.

Path optimization subsystem: A function of the path optimization subsystem is to provide, according to a location that is of a vehicle in a network and that is determined by the vehicle positioning subsystem and a destination entered by a traveler and with reference to the information of the traffic network transmitted by the traffic information collection and processing subsystem, the traveler with a driving path that can avoid congestion, reduce a delay, and effectuate the traveler to rapidly arrive at the destination. The path is displayed on a screen of an in-vehicle computer or is prompted by sound. Specifically, dynamic path navigation usually means providing, according to dynamic map information, a driver with an optimal path that is from a departure location to a destination. A dynamic path navigation system may include the following three parts:

Traffic information center: The information center is a main control center of the dynamic path navigation system, and has a main function of obtaining real-time traffic information from various information sources. In the embodiments of the present disclosure, the traffic information center is referred to as a server end.

Communications system: The communications system is responsible for completing data exchange between a vehicle and the traffic information center.

In-vehicle navigation unit: An in-vehicle navigation device mainly includes a computer, a communications device, and a vehicle positioning device. The positioning device is a GPS receiver or a beacon signal receiver or another positioning device such as a speed sensor or a direction sensor, and a main function of the positioning device is to receive, store, and process traffic information. The in-vehicle computer provides a desirable human-machine interface for a driver, and is convenient for the driver to enter information and obtain a navigation instruction. The navigation instruction is usually in a text form, a sound form, or a graphical form.

A navigation terminal sends preset location information to a server by using the communications system. The server generates navigation information according to the preset information, and the server sends the navigation information to the navigation terminal by using the communications system. Then, the navigation terminal generates a navigation route according to the navigation information to provide a reference for a user. The navigation terminal may further perform navigation according to the navigation route.

A user sometimes performs another operation in a navigation process, for example, listens to music or makes a call. That is, a music window, a communication window, or the like is displayed on a display interface of the navigation terminal. However, people usually expect to know in advance a road condition ahead. In this case, the user usually needs to switch the display interface of the navigation terminal from another window to a navigation window, to obtain road-condition-related information. Usually, window switching is manually performed by the user. However, it is inconvenient to perform a manual operation during the navigation. Therefore, automatic window switching is needed.

In the prior art, a timer may be set in a navigation terminal. After the timer expires, the navigation terminal may switch from another window to a navigation window, to obtain road-condition-related information.

However, when the timer is set in the navigation terminal currently, excessively long duration may be set. If road condition information of an emergency situation is generated within the duration, the navigation terminal cannot display the navigation window in a timely manner. Consequently, a user cannot obtain the road-condition-related information in a timely manner.

In some embodiments of the present disclosure, the navigation terminal first obtains first navigation information and generates a first navigation route according to the first navigation information. The navigation terminal receives second navigation information sent by the server. The second navigation information includes a real-time route parameter of the first navigation route. When the real-time route parameter satisfies a preset condition, the navigation terminal effectuates a navigation window to pop up or automatically adjusts content presented in a navigation window.

Figure 2:
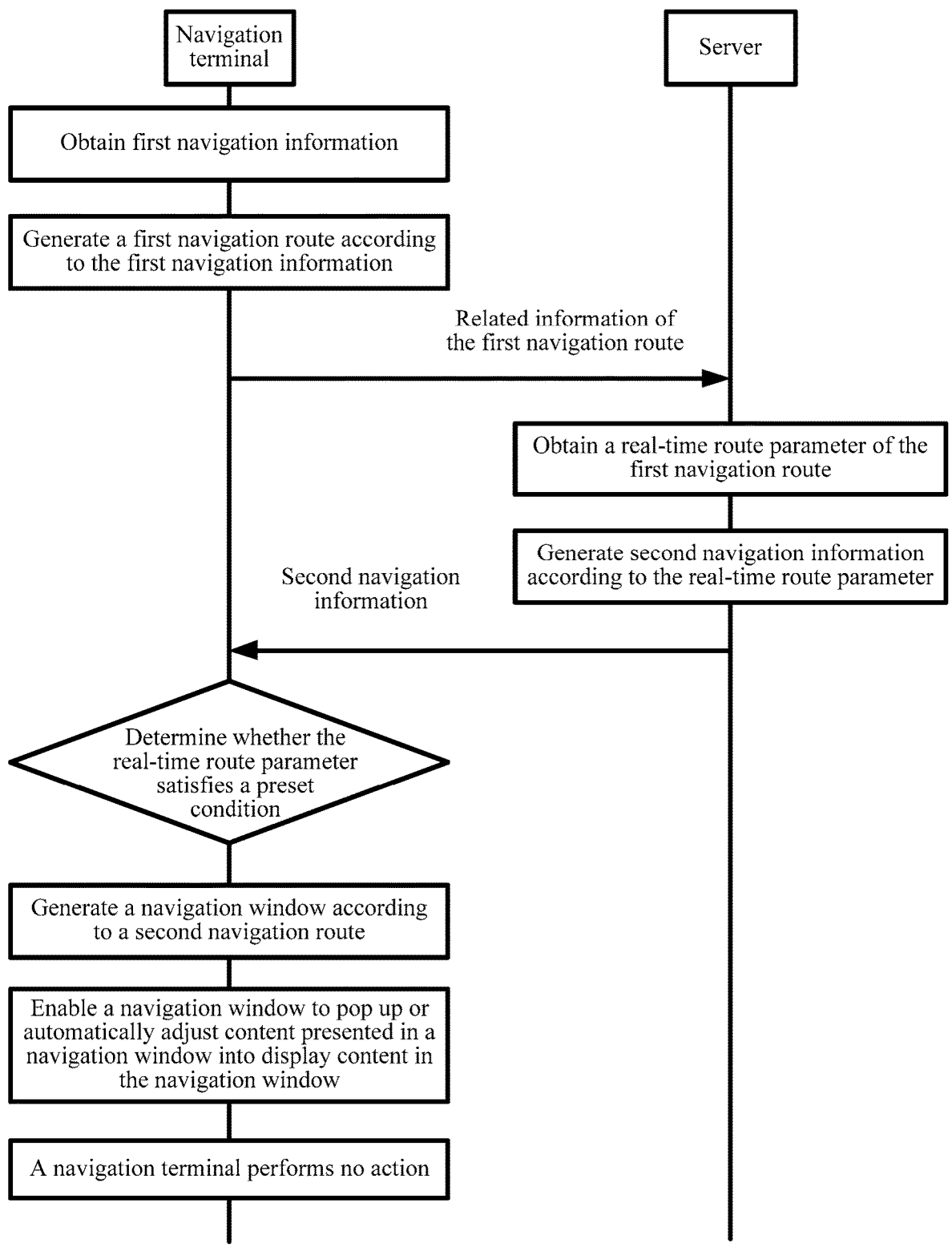
FIG. 2 is a schematic diagram of an embodiment of a navigation method according to the embodiments of the present disclosure.

For ease of understanding, the following describes the embodiments of the present disclosure with reference to the accompanying drawings. It should be noted that there are two possible methods for determining whether a real-time route parameter satisfies a preset condition in the embodiments of the present disclosure, and the two possible methods are described below separately. Referring to FIG. 2, an embodiment of a navigation method according to the embodiments of the present disclosure includes the following steps.

1. A navigation terminal determines whether a real-time route parameter satisfies a preset condition.

201. The navigation terminal obtains first navigation information.

The navigation terminal sends location information and navigation-related information to a server. The server generates the first navigation information according to the location information and the navigation-related information and sends the navigation information to the navigation terminal. Alternatively, the navigation terminal obtains stored first navigation information from the navigation terminal itself.

It may be understood that, the location information may be an area of concern that is generated by the navigation terminal by collecting statistics about usual navigation data of a user, or location information entered by a user and received by the navigation terminal. For example, the user sets a current location A as a start point and sets a target location B. Alternatively, the location information may be positioning information that is received by the navigation terminal in real time during a drive. For example, the location information may be that the navigation terminal is at an intersection or may be information that is about a location between the navigation terminal and a target terminal, that is entered by a user, and that is received by the navigation terminal. This is not specifically limited herein. The navigation-related information may be avoiding congestion, or a shortest distance, or a minimum quantity of traffic lights. This is not specifically limited herein.

202. The navigation terminal generates a first navigation route according to the first navigation information.

After the navigation terminal obtains the first navigation information, the navigation terminal parses the first navigation information to obtain a navigation identifier. The navigation terminal determines a route on a map as the first navigation route by using the navigation identifier. For example, the navigation identifier obtained by parsing the first navigation information is a start location, an end location, a target location to be passed midway, or the like.

It may be understood that, the navigation terminal does not generate only one navigation route according to the first navigation information. The navigation terminal may generate multiple navigation routes at the same time. Then the navigation terminal selects a corresponding route from the multiple navigation routes according to preset navigation-related information and displays the route. Alternatively, the navigation terminal may display all of the multiple navigation routes. A generation manner and a display manner are not limited herein.

It should be noted that, the navigation terminal may further perform navigation according to the first navigation route after generating the first navigation route. This step is performed in a scenario in which the navigation terminal re-plans a route according to a real-time route parameter, and may not be performed in another case.

203. The navigation terminal sends information about the first navigation route to a server.

The navigation terminal sends location information of the first navigation route to the server before the navigation.

204. The server obtains a real-time route parameter of the first navigation route.

The server obtains the real-time route parameter of the first navigation route in real time according to the location information of the first navigation route.

It may be understood that, the real-time route parameter may be a road traffic condition parameter or a location parameter of a target terminal or a location parameter of a scenic spot. Details are not limited herein.

205. The server generates second navigation information according to the real-time route parameter.

The server encodes the real-time route parameter of the first navigation route to generate the second navigation information.

206. The server sends the second navigation information to the navigation terminal.

The server sends the second navigation information to the navigation terminal by using an antenna.

207. The navigation terminal determines whether the real-time route parameter satisfies a preset condition, and if the real-time route parameter satisfies the preset condition, performs step 208 to step 209, or if the real-time route parameter does not satisfy the preset condition, performs step 210.

The navigation terminal receives the second navigation information sent by the server and parses the second navigation information to obtain the real-time route parameter. The navigation terminal performs matching between the real-time route parameter and the preset condition, to determine whether the real-time route parameter satisfies the preset condition.

It may be understood that, when the real-time route parameter is a road traffic condition parameter, the navigation terminal determines whether the road traffic condition parameter indicates that the first navigation route is impassable or a moving speed is relatively slow. If a determining result indicates that the first navigation route is impassable or the moving speed is relatively slow, the navigation terminal determines that the road traffic condition parameter satisfies the preset condition. For example, if the navigation terminal determines, according to a quantity of vehicles that stop at a red light in the first navigation route, whether the first navigation route is congested, the navigation terminal presets, before the determining, a condition: when the quantity of vehicles that stop at a red light is greater than 20, it indicates that the first navigation route is congested. When the navigation terminal drives in the first navigation route, the road traffic condition parameter in the received second navigation information indicates that a quantity of vehicles that currently stop at a red light is 30, then, the navigation terminal determines that the road traffic condition parameter satisfies the preset condition of effectuating a window to pop up.

When the real-time route parameter is a location parameter of a target terminal, the navigation terminal receives the second navigation information sent by the server and parses the second navigation information to obtain the location parameter of the target terminal. The navigation terminal determines whether a distance between a location of the navigation terminal and a location of the target terminal is greater than a preset threshold. If a determining result indicates that the distance between the location of the navigation terminal and the location of the target terminal is greater than the preset threshold, the navigation terminal determines that the real-time route parameter satisfies the preset condition. For example, the navigation terminal presets, before performing navigation according to the first navigation route, that the distance between the navigation terminal and the target terminal cannot exceed 1000 meters, and the navigation terminal receives location information of the target terminal in real time during a drive. When the distance between the location of the navigation terminal and the location of the target terminal is greater than 1000 meters, the navigation terminal determines that the real-time route parameter satisfies the preset condition of effectuating a window to pop up.

When the real-time route parameter is a location parameter of a scenic spot, the navigation terminal receives the second navigation information sent by the server and parses the second navigation information to obtain a location parameter of a building or region in a preset range of a location of the navigation terminal. The navigation terminal determines whether the building or region is a scenic spot. If a determining result indicates that the building or region is a scenic spot, the navigation terminal determines that the real-time route parameter satisfies the preset condition. For example, the navigation terminal presets, before performing navigation according to the first navigation route, that a building or region whose location parameter can be received by the navigation terminal is located within two kilometers that the location of the navigation terminal extends for, and the navigation terminal receives, in real time during a drive, a location parameter of a building or region located within two kilometers that the location of the navigation terminal extends for. When the navigation terminal determines that the location parameter is a scenic spot, the navigation terminal determines that the real-time route parameter satisfies the preset condition of effectuating a window to pop up. A specific determining manner is not limited herein.

In addition, it may be understood that, in a determining process, the road traffic condition parameter may be the quantity of vehicles that stop at a red light in the first navigation route, or an average speed in the first navigation route, or a level of a bad weather ahead in the first navigation route. A value of the road traffic condition parameter is not limited herein. A preset distance between the location of the navigation terminal and the location of the target terminal is set by the user himself or herself, and is not limited herein. It may be understood that, the preset range of the location of the navigation terminal is set by the user himself or herself, and is not limited herein.

In a use process of the navigation terminal, the user may choose not to effectuate a function of effectuating a navigation window to pop up or automatically adjusting content presented in a navigation window. When the user does not need to effectuate the function, step 207 to step 209 are not performed.

208. The navigation terminal generates a navigation window according to the second navigation information.

After receiving the second navigation information, the navigation terminal decodes the second navigation information to obtain a related navigation identifier. The navigation terminal generates the navigation window according to the navigation identifier. It may be understood that, the navigation terminal may generate a second navigation route and then generate the navigation window according to the second navigation route, or may directly determine a navigation area according to the second navigation information and then generate the navigation window according to the navigation area. This is not limited herein.

A process of generating the second navigation route by the navigation terminal is as follows:

When the real-time route parameter is a road traffic condition parameter, after obtaining a message indicating that the first navigation route is congested, the navigation terminal obtains location information of the navigation terminal itself and information about a target location by using a Global Positioning System (GPS) and generates one or more candidate navigation routes in avoidance of the first navigation route. The navigation terminal sends information about the generated candidate navigation route to the server. The server queries for real-time road condition information of the candidate navigation route, and sends the real-time road condition information to the navigation terminal. After the navigation terminal receives real-time road condition information of each candidate navigation route, the navigation terminal comprehensively considers the real-time road condition information of each candidate navigation route and selects one candidate navigation route as the second navigation route. For example, the candidate navigation routes include a navigation route that is uncongested but relatively long, a navigation route that has a normal moving speed but is relatively short, and a navigation route that is uncongested and relatively short but has a poor road condition for driving. In this case, according to a condition that is considered by the user to avoid traffic jams while ensuring safety when the user determines the first navigation route, the navigation terminal may determine the first candidate navigation route as the second navigation route.

When the real-time route parameter is a location parameter of a target terminal, the navigation terminal receives, in real time according to a GPS system, location information of the navigation terminal and location information of the target terminal, or the target terminal sends location information of the target terminal itself to the navigation terminal in real time. After determining locations of the navigation terminal and the target terminal, the navigation terminal sends the location information of the navigation terminal and the location information of the target terminal to the server. The server generates navigation information according to the location information of the navigation terminal and the location information of the target terminal, and sends the navigation information to the navigation terminal. The navigation terminal parses the navigation information to obtain a navigation identifier. The navigation terminal determines a route on the map as a third navigation route by using the navigation identifier. It may be understood that, in a process of generating the third navigation route, the server may also obtain road-condition-related information in an area of the location of the navigation terminal and the location of the target terminal and plan a corresponding route with reference to the road-condition-related information, for example, plan a route in avoidance of a congested area or select a shortest route as a preferred route. A specific manner is not limited herein.

When the real-time route parameter is a location parameter of a scenic spot, the navigation terminal determines location information of the navigation terminal and location information of the scenic spot according to a GPS system. After determining locations of the navigation terminal and the scenic spot, the navigation terminal sends the location information of the navigation terminal and the location information of the scenic spot to the server. The server generates navigation information according to the location information of the navigation terminal and the location information of the scenic spot, and sends the navigation information to the navigation terminal. The navigation terminal parses the navigation information to obtain a navigation identifier. The navigation terminal determines a route on the map as a fourth navigation route by using the navigation identifier. A specific manner of generating the fourth navigation route is not limited herein. It may be understood that, in a process of generating the fourth navigation route, the server may also obtain road-condition-related information in an area of the location of the navigation terminal and the location of the scenic spot and plan a corresponding route with reference to the road-condition-related information, for example, plan a route in avoidance of a congested area or select a shortest route as a preferred route. A specific manner is not limited herein. A process of determining the navigation area by the navigation terminal is as follows:

When the real-time route parameter is a road traffic condition parameter, the navigation terminal determines a first navigation area according to the second navigation information, where the first navigation area includes the location of the navigation terminal, a target location, and an area in which the road traffic condition parameter occurs; or the navigation terminal determines a second navigation area according to the second navigation information, where the second navigation area includes the location of the navigation terminal and an area in which the road traffic condition parameter occurs.

When the real-time route parameter is a location parameter of a target terminal, the navigation terminal determines the location of the navigation terminal and a location of the target terminal as a third navigation area.

When the real-time route parameter is a location parameter of a scenic spot, the navigation terminal determines the location of the navigation terminal and a location of the scenic spot as a fourth navigation area.

In addition, it may be understood that, display content of the second navigation route or the navigation area may include only a route, and may also include a real-time road condition of the second navigation route. The display content is not limited herein. In addition, when the real-time road condition is displayed, different road condition information may be indicated by using different colors. For example, red indicates a congestion status of a road condition, and different shades of red indicate different congestion statuses; yellow indicates a weather status ahead in the second navigation route, and different shades of yellow indicate different weather problems. A specific display manner is not limited herein.

209. The navigation terminal effectuates the navigation window to pop up or automatically adjusts content presented in the navigation window.

The navigation terminal effectuates the navigation window to pop up as a small window or a partial window. Alternatively, content in a navigation interface of the navigation terminal is updated to the content presented in the navigation window.

A display manner of the navigation window is not limited herein.

210. The navigation terminal performs no action.

The navigation terminal determines that the real-time route parameter does not satisfy the preset condition of effectuating the navigation window to pop up, and the navigation terminal performs no action and maintains a current status.

1. A server determines whether a real-time route parameter satisfies a preset condition.

Figure 3:
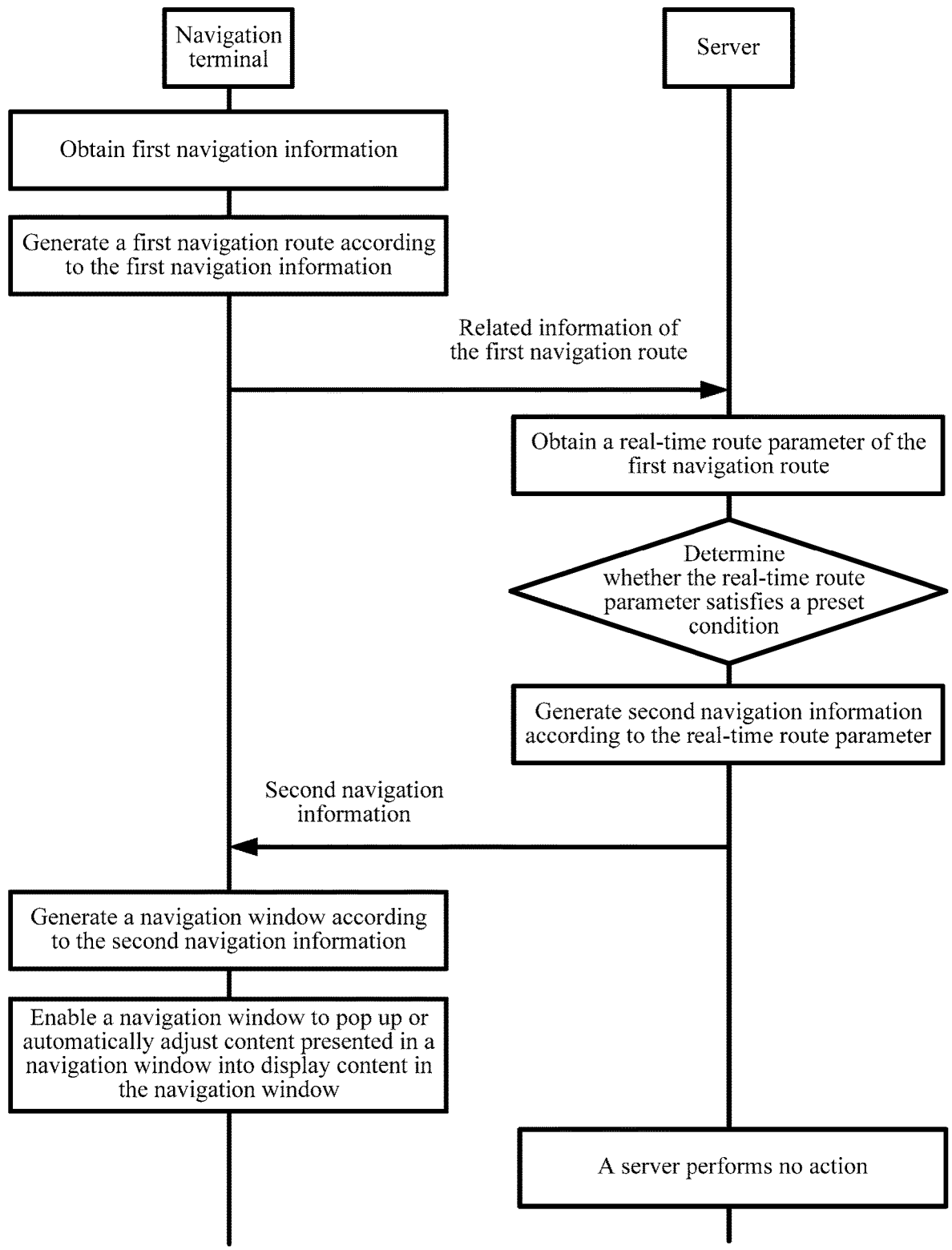
FIG. 3 is a schematic diagram of another embodiment of a navigation method according to the embodiments of the present disclosure.

Referring to FIG. 3, another embodiment of a navigation method according to the embodiments of the present disclosure includes the following steps.

Step 301 to step 304 in this embodiment are the same as step 201 to step 204 in the foregoing embodiment, and details are not described herein again.

305. The server determines whether the road traffic condition parameter satisfies a preset condition, and if the road traffic condition parameter satisfies the preset condition, the server performs step 306 to step 309, or if the road traffic condition parameter does not satisfy the preset condition, the server performs step 310.

After the server obtains the real-time route parameter of the first navigation route, the server performs matching between the real-time route parameter and the preset condition, to determine whether the real-time route parameter satisfies the preset condition.

It may be understood that, when the real-time route parameter is a road traffic condition parameter, the server determines whether the road traffic condition parameter indicates that the first navigation route is impassable or a moving speed is relatively slow. If a determining result indicates that the first navigation route is impassable or the moving speed is relatively slow, the server determines that the real-time route parameter satisfies the preset condition. For example, if the server determines, according to a quantity of vehicles that stop at a red light in the first navigation route, whether the first navigation route is congested, the server presets, before the determining, a condition: when the quantity of vehicles that stop at a red light is greater than 20, it indicates that the first navigation route is congested. When the road traffic condition parameter obtained by the server indicates that a quantity of vehicles that currently stop at a red light is 30, the server determines that the real-time route parameter satisfies the preset condition of sending second navigation information.

When the real-time route parameter is a location parameter of a target terminal, the server obtains the location parameter of the target terminal. The server determines whether a distance between a location of the navigation terminal and a location of the target terminal is greater than a preset threshold. If a determining result indicates that the distance between the location of the navigation terminal and the location of the target terminal is greater than the preset threshold, the server determines that the real-time route parameter satisfies the preset condition. For example, the server presets, before the navigation terminal performs navigation, that the distance between the navigation terminal and the target terminal cannot exceed 1000 meters, and the server receives location information of the target terminal in real time. When the distance between the location of the navigation terminal and the location of the target terminal is greater than 1000 meters, the server determines that the real-time route parameter satisfies the preset condition of sending second navigation information.

When the real-time route parameter is a location parameter of a scenic spot, the server receives a location parameter of a building or region in a preset range of a location of the navigation terminal. The server determines whether the building or region is a scenic spot. If a determining result indicates that the building or region is a scenic spot, the server determines that the location parameter of the scenic spot satisfies the preset condition. For example, the server presets, before the navigation terminal performs navigation, that a building or region whose location parameter can be received is located within two kilometers that the location of the navigation terminal extends for, and the server receives, in real time during a drive of the navigation terminal, a location parameter of a building or region located within two kilometers that the location of the navigation terminal extends for. When the server determines that the location parameter is a scenic spot, the server determines that the real-time route parameter satisfies the preset condition of sending second navigation information.

In addition, it may be understood that, in a determining process, the road traffic condition parameter may be the quantity of vehicles that stop at a red light in the first navigation route, or an average speed in the first navigation route, or a level of a bad weather ahead in the first navigation route. A value of the road traffic condition parameter is not limited herein. A preset distance between the location of the navigation terminal and the location of the target terminal is set by a user himself or herself, and is not limited herein. The preset range of the location of the navigation terminal is set by the user himself or herself, and is not limited herein.

In a use process of the navigation terminal, the user may choose not to effectuate a function of effectuating a navigation window to pop up or automatically adjusting content presented in a navigation window. When the user does not need to effectuate the function, step 305 to step 309 are not performed.

Step 306 and step 307 in this embodiment are the same as step 205 and step 206 in the foregoing embodiment, and details are not described herein again.

Step 308 and step 309 in this embodiment are the same as step 208 and step 209 in the foregoing embodiment, and details are not described herein again.

310. The server performs no action.

The server determines that the real-time route parameter does not satisfy the preset condition of sending second navigation information, and the server performs no action.

The foregoing describes the navigation method in the embodiments of the present disclosure, and the following describes a navigation terminal in the embodiments of the present disclosure.

Figure 4:
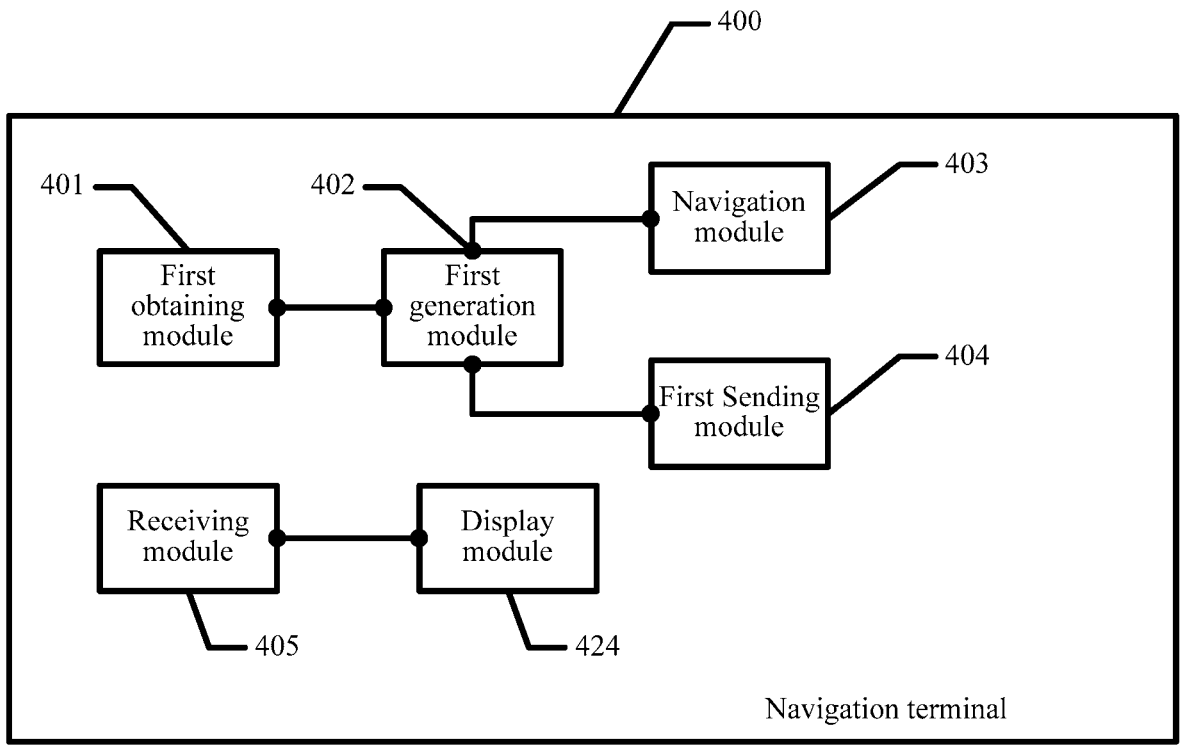
FIG. 4 is a schematic diagram of an embodiment of a navigation terminal according to the embodiments of the present disclosure.

Referring to FIG. 4, an embodiment of a navigation terminal 400 according to the embodiments of the present disclosure includes:

a first obtaining module 401, configured to obtain first navigation information;

a first generation module 402, configured to generate a first navigation route according to the first navigation information obtained by the first obtaining module 401;

a navigation module 403, configured to perform navigation according to the first navigation route generated by the first generation module 402;

a first sending module 404, configured to send information about the first navigation route generated by the first generation module 402 to a server; and a receiving module 405, configured to receive second navigation information sent by the server.

Figure 5:
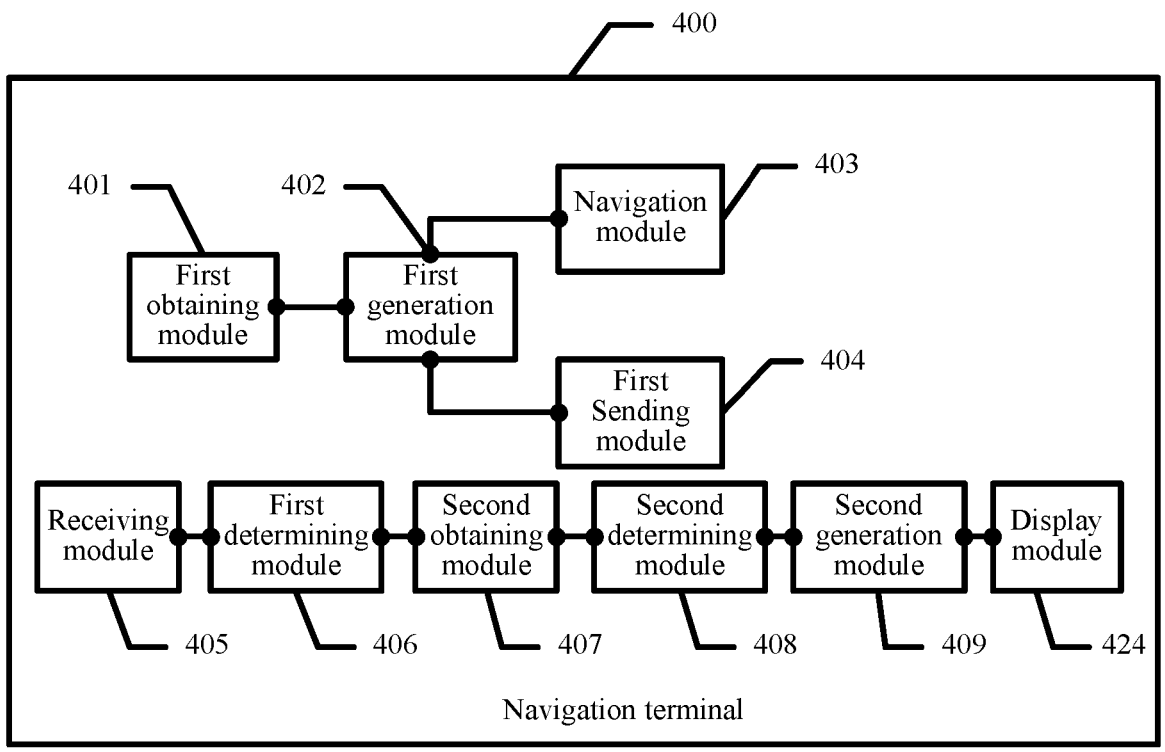
FIG. 5 is a schematic diagram of another embodiment of a navigation terminal according to the embodiments of the present disclosure.

Based on different meanings of a real-time route parameter, that the navigation terminal includes the module 401, the module 402, the module 403, the module 404, the module 405, and a module 424 may include the following several cases:

When the real-time route parameter is a road traffic condition parameter, referring to FIG. 5, in addition to the module 401, module 402, module 403, module 404, module 405, and module 424, the navigation terminal further includes:

a first determining module 406, configured to determine a candidate navigation route according to the second navigation information received by the receiving module 405;

a second obtaining module 407, configured to obtain, from the server, a road condition parameter of the candidate navigation route determined by the first determining module 406;

a second determining module 408, configured to determine, according to the road condition parameter obtained by the second obtaining module 407, a second navigation route in the candidate navigation route determined by the first determining module; and a second generation module 409, configured to generate a first navigation window according to the second navigation route determined by the second determining module 408.

Figure 6:
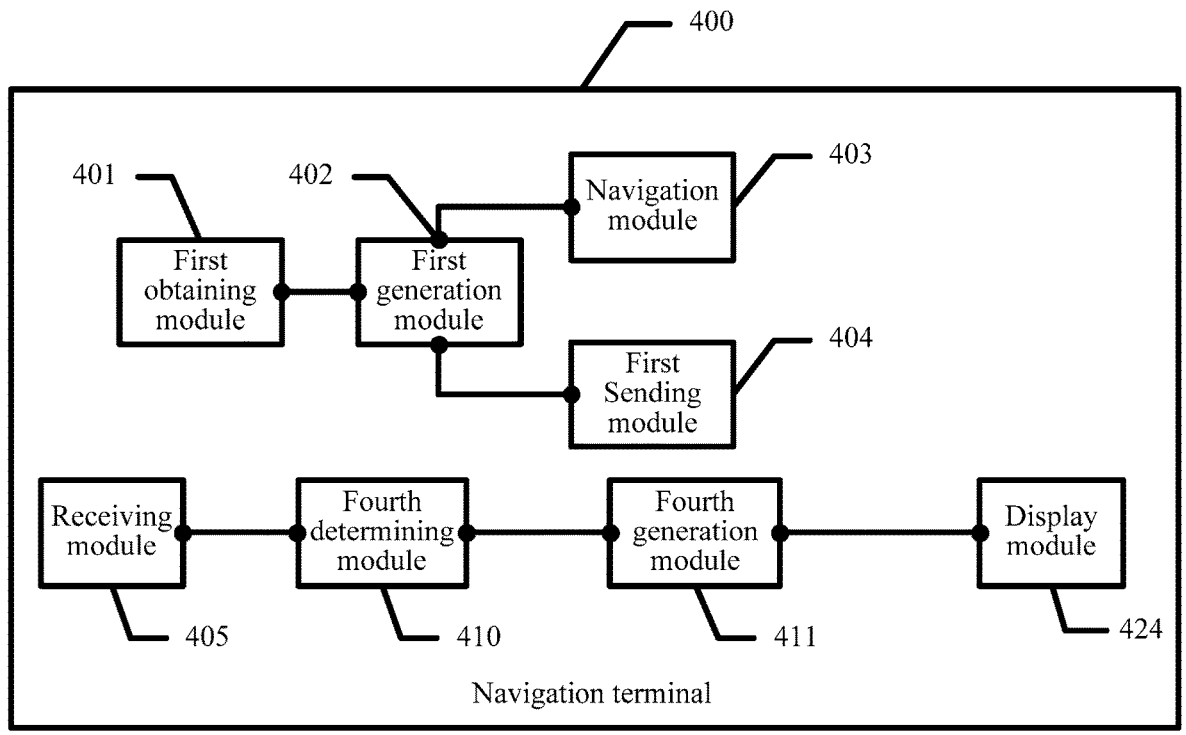
FIG. 6 is a schematic diagram of another embodiment of a navigation terminal according to the embodiments of the present disclosure.

Alternatively, referring to FIG. 6, in addition to the module 401, module 402, module 403, module 404, module 405, and module 424, the navigation terminal further includes:

a fourth determining module 410, configured to determine a second navigation area according to the second navigation information received by the receiving module, wherein the second navigation area comprises the location of the navigation terminal, a target location, and an area in which the real-time route parameter occurs; and a fourth generation module 411, configured to generate a third navigation window according to the second navigation area determined by the fourth determining module.

Figure 7:
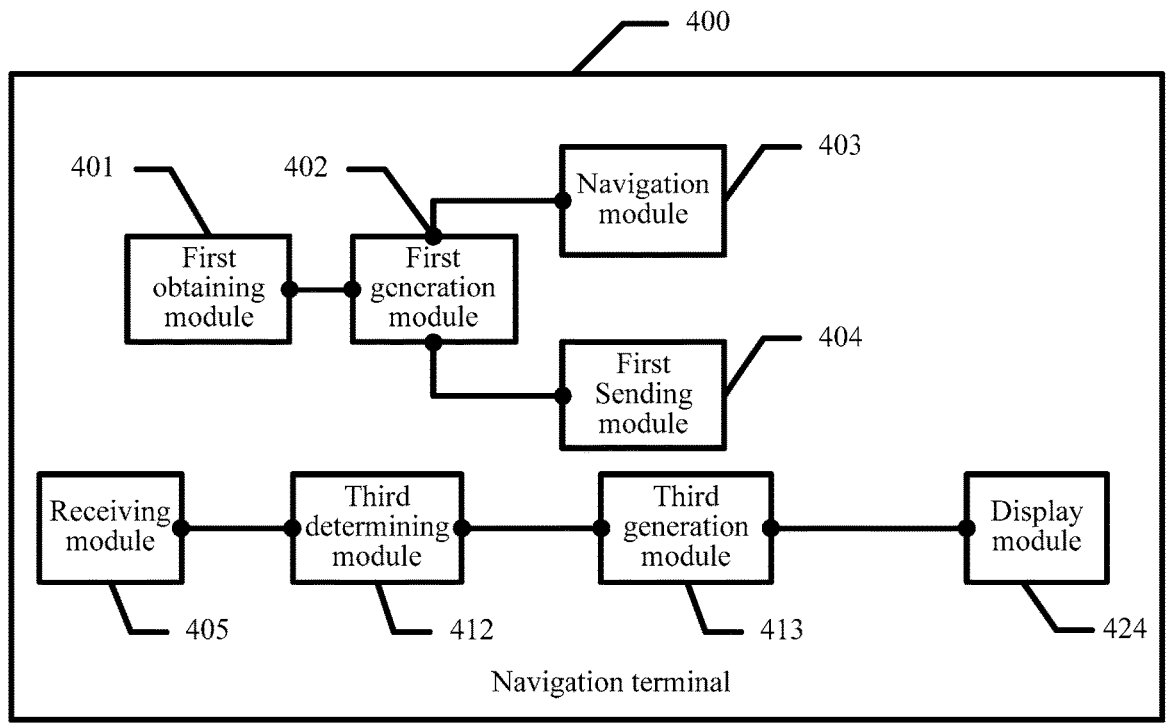
FIG. 7 is a schematic diagram of another embodiment of a navigation terminal according to the embodiments of the present disclosure.

Alternatively, referring to FIG. 7, in addition to the module 401, module 402, module 403, module 404, module 405, and module 424, the navigation terminal further includes:

a third determining module 412, configured to determine a first navigation area according to the second navigation information received by the receiving module, wherein the first navigation area comprises the location of the navigation terminal and an area in which the real-time route parameter occurs; and a third generation module 413, configured to generate the content in the navigation window according to the first navigation area determined by the third determining module and the real-time route parameter.

Figure 8:
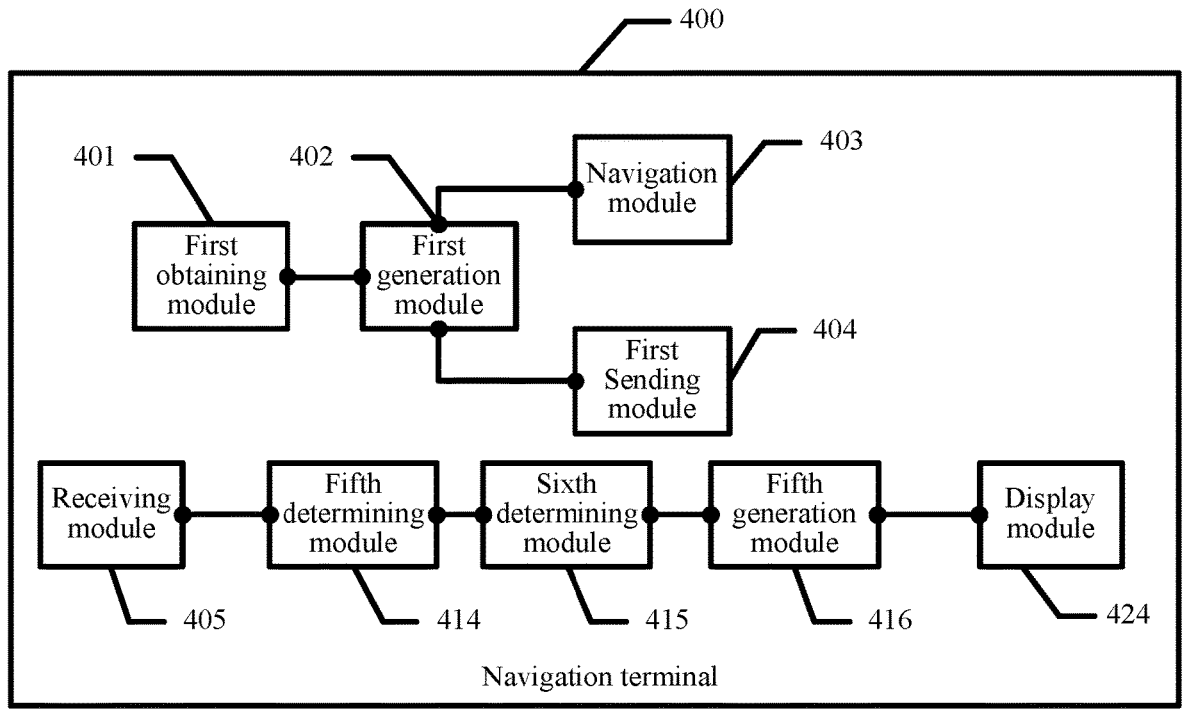
FIG. 8 is a schematic diagram of another embodiment of a navigation terminal according to the embodiments of the present disclosure.

When the real-time route parameter is a location parameter of a target terminal, referring to FIG. 8, in addition to the module 401, module 402, module 403, module 404, module 405, and module 424, the navigation terminal further includes:

a fifth determining module 414, configured to determine a location of the navigation terminal and a location of the target terminal;

a sixth determining module 415, configured to determine a third navigation route according to the location of the navigation terminal determined by the fifth determining module 414 and the location of the target terminal determined by the fifth determining module; and a fifth generation module 416, configured to generate a fourth navigation window according to the third navigation route determined by the sixth determining module 415.

Figure 9:
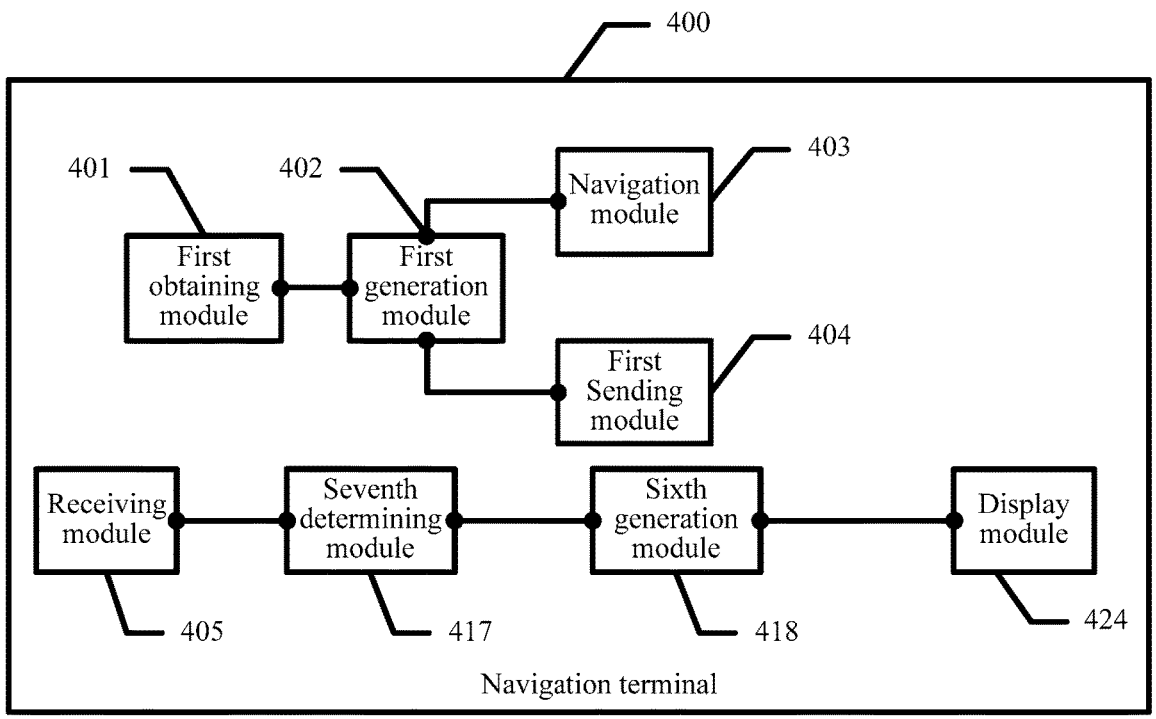
FIG. 9 is a schematic diagram of another embodiment of a navigation terminal according to the embodiments of the present disclosure.

Alternatively, referring to FIG. 9, in addition to the module 401, module 402, module 403, module 404, module 405, and module 424, the navigation terminal further includes:

a seventh determining module 417, configured to determine a location of the navigation terminal and a location of the target terminal; and a sixth generation module 418, configured to generate a fifth navigation window according to the location of the navigation terminal determined by the seventh determining module 417 and the location of the target terminal determined by the seventh determining module.

Figure 10:
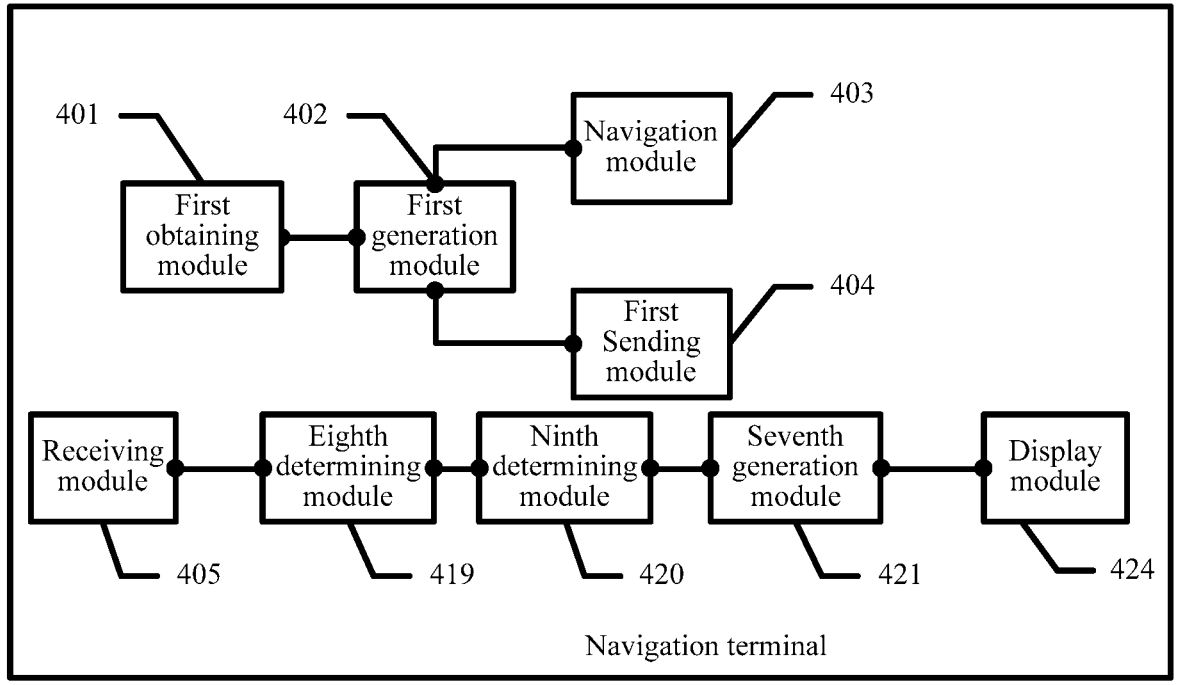
FIG. 10 is a schematic diagram of another embodiment of a navigation terminal according to the embodiments of the present disclosure.

When the real-time route parameter is a location parameter of a scenic spot, referring to FIG. 10, in addition to the module 401, module 402, module 403, module 404, module 405, and module 424, the navigation terminal further includes:

an eighth determining module 419, configured to determine a location of the navigation terminal and a location of the scenic spot;

a ninth determining module 420, configured to determine a fourth navigation route according to the location of the navigation terminal determined by the eighth determining module 419 and the location of the scenic spot determined by the eighth determining module; and a seventh generation module 421, configured to generate a sixth navigation window according to the fourth navigation route determined by the ninth determining module 420.

Figure 11:
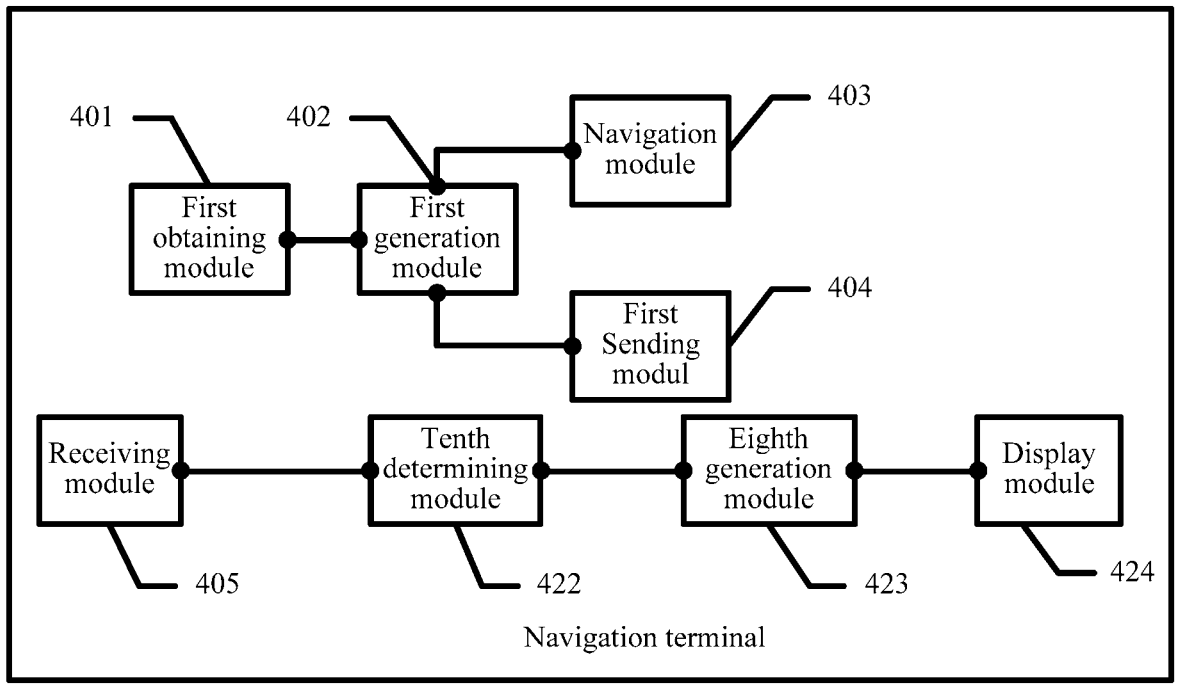
FIG. 11 is a schematic diagram of another embodiment of a navigation terminal according to the embodiments of the present disclosure.

Alternatively, referring to FIG. 11, in addition to the module 401, module 402, module 403, module 404, module 405, and module 424, the navigation terminal further includes:

a tenth determining module 422, configured to determine a location of the navigation terminal and a location of the scenic spot;

an eighth generation module 423, configured to generate a seventh navigation window according to the location of the navigation terminal determined by the tenth determining module 422 and the location of the scenic spot determined by the tenth determining module 422; and a display module 424, configured to: when the real-time route parameter satisfies a preset condition, effectuate a navigation window to pop up or automatically adjust content presented in a navigation window.

The foregoing describes the navigation terminal in the embodiments of the present disclosure, and the following describes a server in the embodiments of the present disclosure.

Figure 12:
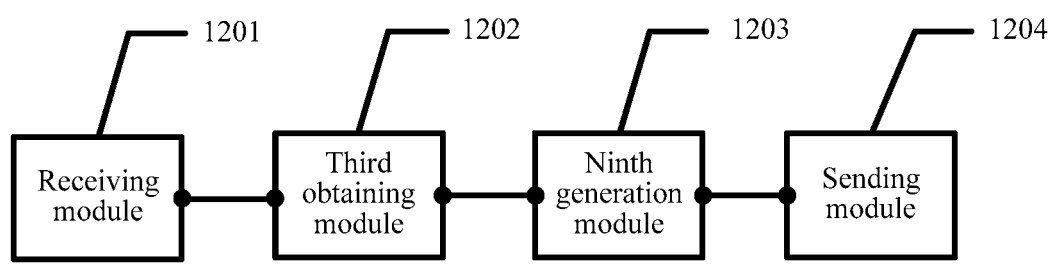
FIG. 12 is a schematic diagram of an embodiment of a server according to the embodiments of the present disclosure.

Referring to FIG. 12, an embodiment of a server according to the embodiments of the present disclosure includes:

a receiving module 1201, configured to receive information that is about a first navigation route and that is sent by a navigation terminal;

a third obtaining module 1202, configured to obtain a real-time route parameter of the first navigation route;

a ninth generation module 1203, configured to generate second navigation information according to the real-time route parameter obtained by the third obtaining module 1202; and a sending module 1204, configured to send the second navigation information generated by the ninth generation module 1203 to the navigation terminal.

Figure 13:
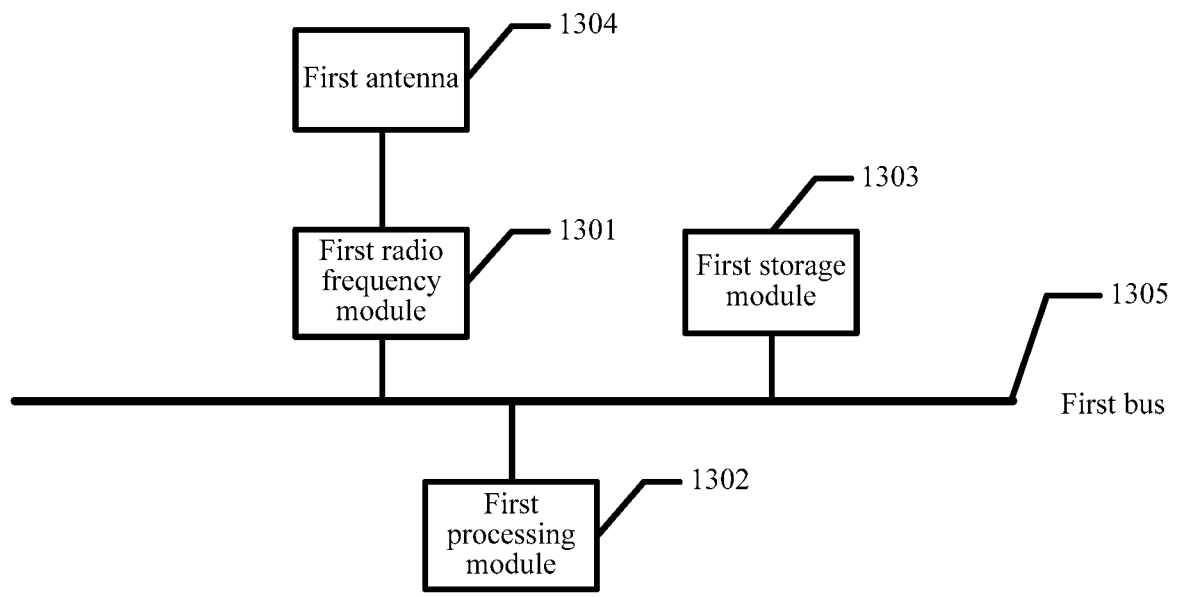
FIG. 13 is a schematic diagram of an embodiment of a navigation terminal according to the embodiments of the present disclosure.

Referring to FIG. 13, an embodiment of the present application provides a navigation terminal, including:

a first radio frequency module 1301, a first processing module 1302, a first storage module 1303 a first antenna 1304, and a first bus 1305.

The first radio frequency module 1301 is connected to the first antenna 1304, and the first radio frequency module 1301, the first processing module 1302, and the first storage module 1303 are connected by using the first bus 1305.

The first radio frequency module 1301 receives, by using the first antenna 1304, second navigation information sent by a server.

The first processing module 1302 executes the following actions:

obtaining first navigation information; generating a first navigation route according to the first navigation information; and effectuating a navigation window to pop up or automatically adjusting content presented in a navigation window.

With reference to the foregoing embodiment, the first processing module 1302 may further execute the following actions:

determining a candidate navigation route according to the second navigation information, obtaining a road condition parameter of the candidate navigation route from the server, determining a second navigation route in the candidate navigation route according to the road condition parameter, and generating a first navigation window according to the second navigation route; or determining a location of the navigation terminal and a location of a target terminal, determining a third navigation route according to the location of the navigation terminal and the location of the target terminal, and generating a fourth navigation window according to the third navigation route, or generating a fifth navigation window according to the location of the navigation terminal and the location of the target terminal; or determining a location of the navigation terminal and a location of a scenic spot, determining a fourth navigation route according to the location of the navigation terminal and the location of the scenic spot, and generating a sixth navigation window according to the fourth navigation route, or generating a seventh navigation window according to the location of the navigation terminal and the location of the scenic spot; or determining a first navigation area according to the second navigation information, where the first navigation area includes a location of the navigation terminal and an area in which a road traffic condition parameter occurs, and generating a second navigation window according to the first navigation area; or determining a second navigation area according to the second navigation information, where the second navigation area includes a location of the navigation terminal, a target location, and an area in which a road traffic condition parameter occurs, and generating a third navigation window according to the second navigation area.

Figure 14:
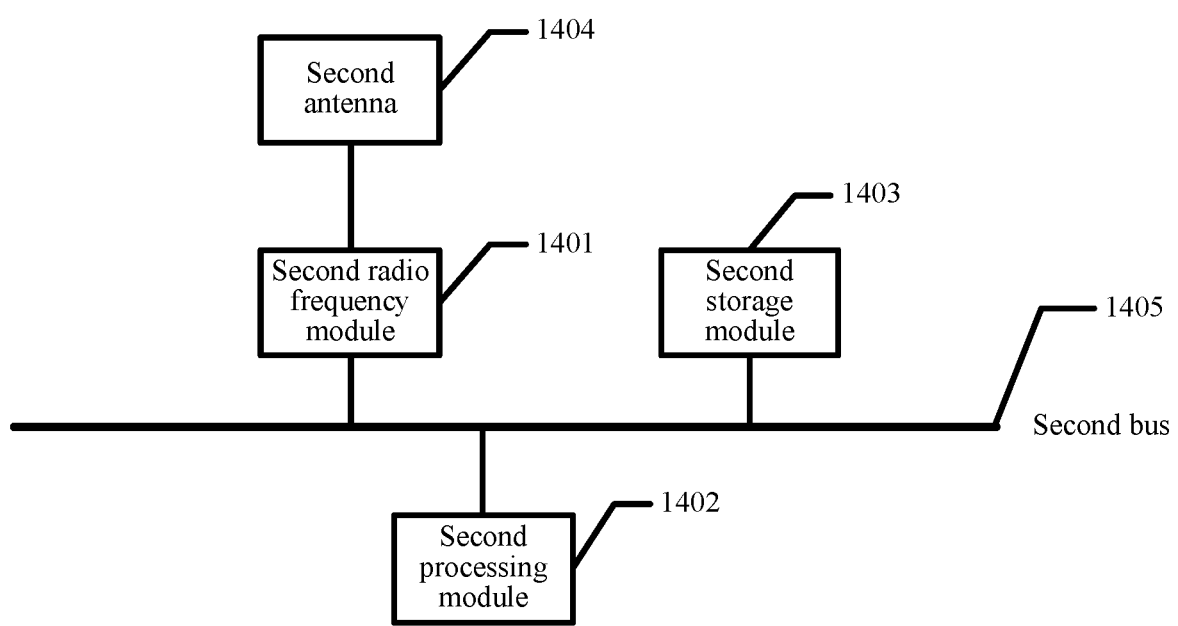
FIG. 14 is a schematic diagram of an embodiment of a server according to the embodiments of the present disclosure.

Referring to FIG. 14, an embodiment of the present application provides a server, including:

a second radio frequency module 1401, a second processing module 1402, a second storage module 1403, a second antenna 1404, and a second bus 1405.

The second radio frequency module 1401 is connected to the second antenna 1404, and the second radio frequency module 1401, the second processing module 1402, and the second storage module 1403 are connected by using the second bus 1405.

The second radio frequency module 1401 sends second navigation information to a navigation terminal by using the second antenna 1404.

The second processing module 1402 implements the following functions:

obtaining a real-time route parameter of a first navigation route; and generating the second navigation information.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The foregoing embodiments are merely intended for describing the technical solutions of the embodiments of the present disclosure rather than limiting the present disclosure. Although the embodiments of the present disclosure are described in detail with reference to the foregoing embodiments, persons of ordinary skill in the art should understand that they may still make modifications to the embodiments described herein or make equivalent replacements to some technical features thereof, without departing from the spirit and scope of present disclosure.

What is claimed is:

1. A navigation method, comprising:
   obtaining, by a navigation terminal, first navigation information, wherein the navigation terminal is part of an in-vehicle navigation unit;
   generating, by the navigation terminal, a first navigation route according to the first navigation information;
   sending, by the navigation terminal, information about the first navigation route to a server;
   receiving, by the navigation terminal, second navigation information sent by the server, wherein the second navigation information includes a real-time route parameter of the first navigation route;
   identifying whether the real-time route parameter of the first navigation route satisfies a preset condition, wherein the preset condition comprises a quantity of vehicles that stop at a red light is greater than a second preset threshold, and wherein identifying whether the real-time route parameter satisfies the preset condition comprises identifying that the quantity of vehicles are stopped by the red light, retrieving a second preset threshold associated with the red light, and comparing the quantity of vehicles to the second preset threshold; and
   when the real-time route parameter of the first navigation route satisfies the preset condition, automatically switching, by the navigation terminal, a display interface from another window to a navigation window to present the second navigation information in the navigation window.

2. The navigation method according to claim 1, wherein before the automatically switching, by the navigation terminal, a display interface from another window to the navigation window to present the second navigation information in the navigation window, the method further comprises:
   determining, by the navigation terminal, a candidate navigation route according to the second navigation information;
   obtaining, by the navigation terminal, a road condition parameter of the candidate navigation route from the server;
   determining, by the navigation terminal, a second navigation route in the candidate navigation route according to the road condition parameter; and
   generating, by the navigation terminal, the content in the navigation window according to the second navigation route.

3. The navigation method according to claim 1, wherein before the automatically switching, by the navigation terminal, a display interface from another window to the navigation window to present the second navigation information in the navigation window, the method further comprises:
   determining, by the navigation terminal, a first navigation area according to the second navigation information, wherein the first navigation area comprises the location of the navigation terminal and an area in which the real-time route parameter occurs; and
   generating, by the navigation terminal, the content in the navigation window according to the first navigation area and the real-time route parameter.

4. The navigation method according to claim 1, wherein before the automatically switching, by the navigation terminal, a display interface from another window to the navigation window to present the second navigation information in the navigation window, the method further comprises:
   determining, by the navigation terminal, a second navigation area according to the second navigation information, wherein the second navigation area comprises a location of the navigation terminal, a target location, and an area in which the real-time route parameter occurs; and
   generating, by the navigation terminal, the content in the navigation window according to the second navigation area and the real-time route parameter.

5. The navigation method according to claim 1, wherein the preset condition comprises:
   a distance between a location of the navigation terminal and a location of a target terminal is greater than a preset distance.

6. The navigation method according to claim 5, wherein before the automatically switching, by the navigation terminal, a display interface from another window to the navigation window to present the second navigation information in the navigation window, the method further comprises:
   determining, by the navigation terminal, the display location of the navigation terminal and the location of the target terminal;
   determining, by the navigation terminal, a third navigation route according to the location of the navigation terminal and the location of the target terminal; and
   generating, by the navigation terminal, the content in the navigation window according to the third navigation route.

7. The navigation method according to claim 5, wherein before automatically switching, by the navigation terminal, a display interface from another window to the navigation window to present the second navigation information in the navigation window, the method further comprises:
   determining, by the navigation terminal, the location of the navigation terminal and the location of the target terminal; and
   generating, by the navigation terminal, the content in the navigation window according to the location of the navigation terminal and the location of the target terminal.

8. The navigation method according to claim 1, wherein the preset condition comprises:
a scenic spot that satisfies a preset parameter exists in a preset range of a location of the navigation terminal.

9. The navigation method according to claim 8, wherein before automatically switching, by the navigation terminal, a display interface from another window to the navigation window to present the second navigation information in the navigation window, the method further comprises:
determining, by the navigation terminal, the location of the navigation terminal and a location of the scenic spot;
determining, by the navigation terminal, an another navigation route according to the location of the navigation terminal and the location of the scenic spot; and
generating, by the navigation terminal, the content in the navigation window according to the another navigation route.

10. The navigation method according to claim 8, wherein automatically switching, by the navigation terminal, a display interface from another window to the navigation window to present the second navigation information in the navigation window, the method further comprises:
determining, by the navigation terminal, the location of the navigation terminal and a location of the scenic spot; and
generating, by the navigation terminal, the content in the navigation window according to the location of the navigation terminal and the location of the scenic spot.

11. The navigation method according to claim 1, wherein generating, by the navigation terminal, the first navigation route according to the first navigation information comprises:
after the navigation terminal obtains the first navigation information, the navigation terminal parses the first navigation information to obtain a navigation identifier; and
the navigation terminal determines a route on a map as the first navigation route by using the navigation identifier.

12. The navigation method according to claim 1, wherein:
after the navigation terminal receives the second navigation information, the navigation terminal parses the second navigation information to obtain the real-time route parameter; and
after obtaining the real-time route parameter, the navigation terminal performs matching between the real-time route parameter and the preset condition to determine whether the real-time route parameter satisfies the preset condition.

13. The navigation method according to claim 1, wherein:
after the navigation terminal receives the second navigation information, the navigation terminal decodes the second navigation information to obtain a related navigation identifier; and
generating, by the navigation terminal, the navigation window according to the related navigation identifier.

14. A navigation terminal of an in-vehicle navigation unit, comprising:
a memory storing instructions; and
a processor coupled to the memory to execute the instructions to:
obtain first navigation information;
generate a first navigation route according to the first navigation information;
send information about the first navigation route to a server;
receive second navigation information sent by the server, wherein the second navigation information includes a real-time route parameter of the first navigation route;
identify whether the real-time route parameter of the first navigation route satisfies a preset condition, wherein the preset condition comprises a quantity of vehicles that stop at a red light is greater than a second preset threshold, and wherein identifying whether the real-time route parameter satisfies the preset condition comprises identifying that the quantity of vehicles are stopped by the red light, retrieving a second preset threshold associated with the red light, and comparing the quantity of vehicles to the second preset threshold; and
automatically switch a display interface from another window to a navigation window to present the second navigation information in the navigation window, when the real-time route parameter that is of the first navigation route and that is received by the receiving module satisfies the preset condition.

15. A navigation method, comprising:
obtaining, by a server, a real-time route parameter of a first navigation route, wherein the first navigation route is generated by a navigation terminal according to obtained first navigation information;
identifying whether the real-time route parameter of the first navigation route satisfies a preset condition, wherein the preset condition comprises a quantity of vehicles that stop at a red light is greater than a second preset threshold, and wherein identifying whether the real-time route parameter satisfies the preset condition comprises identifying that the quantity of vehicles are stopped by the red light, retrieving a second preset threshold associated with the red light, and comparing the quantity of vehicles to the second preset threshold;
when the real-time route parameter of the first navigation route satisfies the preset condition, generating, by the server, second navigation information according to the real-time route parameter; and
sending, by the server, the second navigation information to the navigation terminal, so that a navigation terminal automatically switches a display interface from another window to a navigation window to present the second navigation information in the navigation window.

16. The navigation method according to claim 15, wherein the preset condition comprises:
a distance between a location of the navigation terminal and a location of a target terminal is greater than a preset distance.

17. The navigation method according to claim 15, wherein that the real-time route parameter satisfies a preset condition comprises:
a scenic spot that satisfies a preset parameter exists in a preset range of a location of the navigation terminal.

18. The navigation method according to claim 15, wherein:
after the server obtains the real-time route parameter of the first navigation route, the server performs matching between the real-time parameter and the preset condition to determine whether the real-time route parameter satisfies the preset condition.

* * * * *